Figure 1:
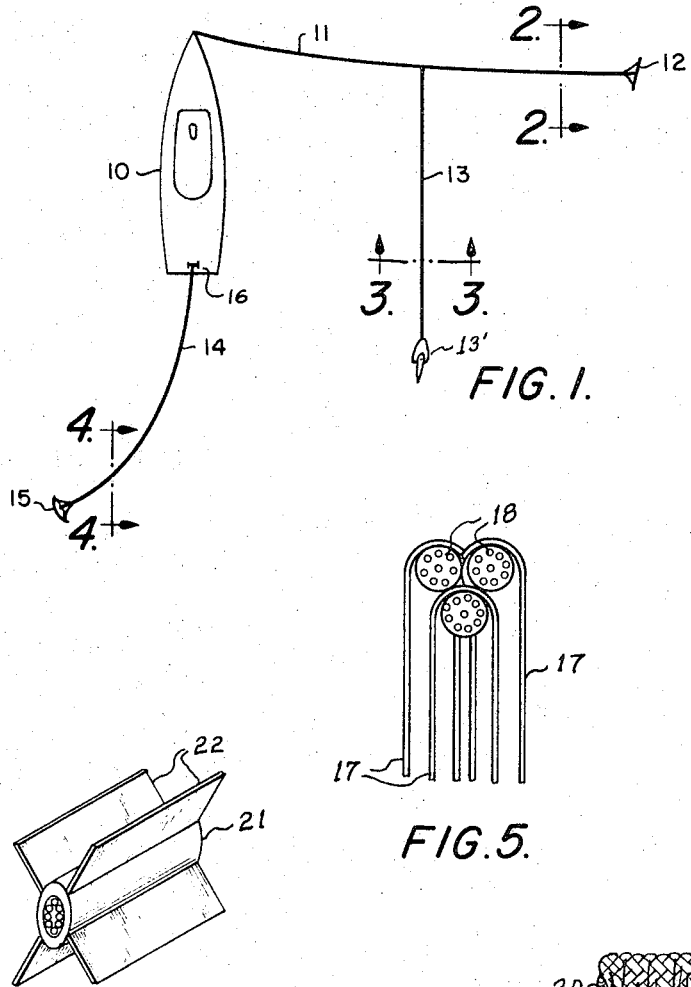

Feb. 13, 1968    R. E. KELLY    3,368,514
SYMMETRICAL SELF-ALINING CABLE FAIRING
Filed Oct. 22, 1965

INVENTOR.
RAYMOND E. KELLY
BY
*Rolla N. Carter*
ATTYS.

United States Patent Office 3,368,514
Patented Feb. 13, 1968

3,368,514
SYMMETRICAL SELF-ALINING CABLE FAIRING
Raymond E. Kelly, Panama City, Fla., assignor to the United States of America as represented by the Secretary of the Navy
Filed Oct. 22, 1965, Ser. No. 502,734
5 Claims. (Cl. 114—235)

The invention described herein may be manufactured and used by or for the Government of the United States of America for governmental purposes without the payment of any royalties thereon or therefor.

The present invention relates to the fairing of flexible cables for the reduction of drag and vibration of such cables when towed through water and more particularly to cable fairings of the "fringe" type.

In many marine operations, tow cables are used extensively for many purposes including the towing of underwater vehicles, mine sweeping arrays utilizing diverters whereby the cable moves transversely through the water, anti-torpedo protective streamers for ships, and the like. Vibration and drag of power, tow and control cables are important limiting factors in the performance of many mine and torpedo countermeasures devices. Significant reduction of such vibration and drag makes possible the towing of more sensitive detection instrumentation as well as permitting higher speed towing or increasing the swept path of present mine sweeping gear utilizing cable diversion.

Cable fairings have been successfully used for many applications of which Patents Nos. 2,397,957 Freeman and 2,668,512 Klas are representative. Cables with such fairings are difficult to handle and store and are susceptible to instability when the mean line of the fairing is misalined with the direction of relative motion as well as when its longitudinal axis approaches an angle parallel to the direction of relative motion. An effective fairing for cables towed at high speeds, for cables towed in a catenary, or for cables whose angle relative to flow varies widely, is not presently available. One recently devised fairing consisting of thongs looped through an external braid to form a double row of flexible thongs in line along one side of a cable has the disadvantage of presenting an unsymmetrical frontal surface to flow when the cable twists or rotates and also when the cable is towed with its longitudinal axis substantially parallel to the direction of flow.

In accordance with the present invention a rope or cable of substantially circular cross section is provided with a fringe comprising a multiplicity of thrums such as thongs, cords or ribbons of flexible and preferably limp and resilient material attached to the rope or cable in a substantially uniform manner around the circumference and throughout the length of the rope or cable where fairing is desired.

An object of the present invention is to provide an improved fairing for cables towed through a body of water.

Another object of the invention is to provide a cable fairing which will reduce vibration and hence cable fatigue regardless of the orientation of the cable with respect to its direction of movement through the water.

A further object of the invention is to provide fairing for single or multiple cables lashed together which will reduce drag on the towed system.

Another object of the invention is to provide a faired cable which will have an axis of streamlined symmetry in any bisecting plane parallel to the direction of relative motion through a fluid.

Figure 2:
Figure 3:
Figure 4:
Figure 5:
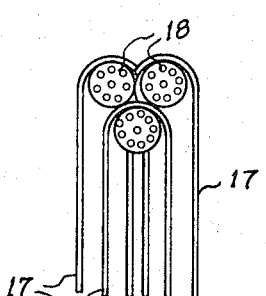
Figure 8:
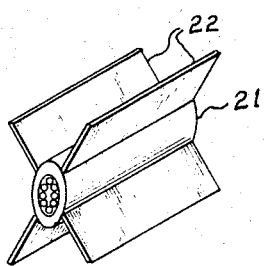
Figure 7:
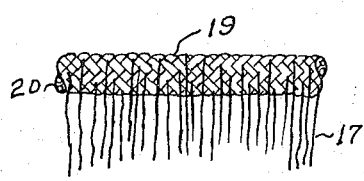
Figure 9:
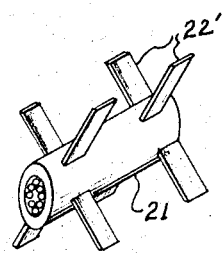
Figure 6:
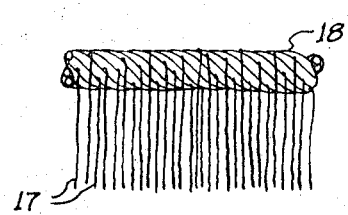

Other objects and attendant advantages of the invention will become evident to one skilled in the art from the following description when read in connection with the accompanying drawing in which:

FIG. 1 is a plan view of a ship towing cables in several typical configurations,
FIG. 2 is a sectional view along lines 2—2 of FIG. 1,
FIG. 3 is a sectional view along lines 3—3 of FIG. 1,
FIG. 4 is a sectional view along lines 4—4 of FIG. 1,
FIG. 5 is a view in section showing fringe forming cords applied to a stranded wire cable,
FIG. 6 is a fragment of a length of cable faired as in FIG. 5,
FIG. 7 shows fairing elements looped through a basket weave armor on an insulated cable, and
FIGS. 8 and 9 illustrate two stages in the manufacture of fairing for a cable having an extruded covering.

Referring now to the drawing for a more complete understanding of the invention and more particularly to FIG. 1 thereof there is shown in diagrammatic form a ship 10 having a faired towing cable 11, which may include one or more electrical conductors, connected to the bow of the ship 10 and provided at its distal end with a paravane 12 to divert the cable 11 at a predetermined angle with respect to the ship 10 as the ship 10 moves through the water. The towing cable 11 has secured thereto a streamer 13, e.g., a line explosive, which preferably is faired in accordance with the invention. An underwater vehicle 13' attached to the distal end of the streamer 13 is adapted under the control of a shipboard operator to be diverted as desired to orient the line explosive 13 athwart the path of an attacking torpedo. Also as shown in FIG. 1 a faired cable 14 variably diverted by an adjustable paravane 15 is streamed from the fantail 16 of the ship 10. The cable 14 may for example be part of a minesweeping array, or a tow for an underwater vehicle (not shown).

In accordance with the invention each of the cables or streamers 11, 13 and 14 are of substantially circular cross section and are provided with limp thrums in a uniform manner around their circumferences throughout their lengths when fairing is desired. As is illustrated in FIGS. 2, 3 and 4, when these faired cables are towed through the water in any orientation including twist the complete cable including the fairing elements or thrums 17 will have an axis of streamlined symmetry in any bisecting plane parallel to the direction of relative motion through the water.

FIGS. 5 and 6 show the fairing thrums 17 looped around strands 18 of a three-strand wire cable. As shown in FIG. 7 the fairing elements 17 are looped through the basket weave armor 19 of a smooth cable 20, such looping preferably being done during application of the basket weave armor 19.

FIGS. 8 and 9 illustrate a method of manufacturing a cable with a plastic sheath 21 provided with integral fins 22 extruded with the sheath 21 and thereafter removing portions of the fins 22 to leave the desired fairing elements 22'. Although the fairing elements 22' appear in FIG. 9 to be self-sustaining such is for the purpose of illustrating the method of manufacture whereas, in fact, these elements 22' will be relatively limp.

The length of the fairing elements 17 has been found to be not critical but their lengths should fall within the range of 4 to 10 times the diameter of the cable being faired.

In addition to their being more or less uniformly distributed around the circumference of the cable being faired, the thrums 17 are distributed along the length of the cable to provide a population density per unit of length such that when the thrums 17 are subjected to water flow they are contiguously disposed to form in effect a solid streamlined body as illustrated in FIGS. 2 and 4.

The improved fairing provided by the present invention increases the high speed towing capability and life of all underwater towed gear and increases the effectiveness of all variably diverted or depressed cable towed underwater gear.

While for the purpose of disclosing the invention preferred embodiments thereof have been described it will be evident to those skilled in the art that many modifications may be made without departing from the invention the scope of which is pointed out in the appended claims.

What is claimed is:

1. A faired cable which maintains a substantially streamlined geometrical configuration while being towed at any attitude through a fluid medium comprising in combination:
   a cable, having a substantially circular cross-section and a predetermined length, capable of being towed through said fluid medium; and
   a plurality of flexible, resilient, substantially uniformly-spaced thrums effectively connected radially to the outer surface of said cable around the entire circumference thereof and along a predetermined length thereof and in such manner and with such density that an optimum streamlined disposition is acquired thereby in the slip-stream contiguous with said cable, as it is being towed at any attitude through said fluid medium.

2. The device of claim 1 wherein the length of each of said plurality of said flexible, resilient, substantially uniformly-spaced thrums is between four and ten times the diameter of said cable.

3. The device of claim 1 wherein said cable includes at least one electrical conductor.

4. The invention according to claim 1 further characterized by a basket weave armor disposed around said cable in such manner that the aforesaid plurality of flexible, resilient, substantially uniformly-spaced thrums extend radially therethrough between the weaves thereof, respectively.

5. The invention according to claim 1 further characterized by a plastic sheath integrally connected to the outer surface of said cable and to the inner radial extremity of each of said plurality of flexible, resilient, substantially uniformly-spaced thrums.

References Cited

Undersea Technology; July 1964, p. 34.

MILTON BUCHLER, *Primary Examiner.*

T. M. BLIX, *Assistant Examiner.*